United States Patent [19]

Gilles

[11] 3,909,493

[45] Sept. 30, 1975

[54] ALIPHATIC ESTERS OF CARBOXYMETHENE- AND CARBOXYETHENETHIOSUCCINIC ACID

[75] Inventor: Jack C. Gilles, Shaker Heights, Ohio

[73] Assignee: The B. F. Goodrich Company, Akron, Ohio

[22] Filed: Aug. 24, 1973

[21] Appl. No.: 391,220

Related U.S. Application Data

[62] Division of Ser. No. 191,491, Oct. 21, 1971, abandoned.

[52] U.S. Cl...... 260/45.7 S; 260/45.85 S; 260/93.7; 260/94.9 GD
[51] Int. Cl.$^2$. C08K 5/11; C08K 5/36; C08L 23/06; C08L 23/12
[58] Field of Search.... 260/94.9 GD;45.7 S, 45.85 S

[56] References Cited
UNITED STATES PATENTS

| | | | |
|---|---|---|---|
| 2,737,525 | 3/1956 | Mulvaney et al. | 260/45.85 S |
| 2,797,231 | 6/1957 | Evans et al. | 260/45.85 S |
| 3,190,852 | 6/1965 | Doyle | 260/45.7 S |
| 3,345,327 | 10/1967 | Dexter et al. | 260/45.85 S |
| 3,433,762 | 3/1969 | Kezerian et al. | 260/45.85 S |
| 3,454,525 | 7/1969 | Tholstrup | 260/45.85 S |
| 3,455,876 | 7/1969 | Kusama et al. | 260/45.85 S |
| 3,464,954 | 9/1969 | Tholstrup | 260/45.85 S |

FOREIGN PATENTS OR APPLICATIONS

| | | | |
|---|---|---|---|
| 40-13257 | 6/1965 | Japan | 260/94.9 GD |

*Primary Examiner*—Joseph L. Schofer
*Assistant Examiner*—A. Holler
*Attorney, Agent, or Firm*—J. Hughes Powell, Jr.; Alan A. Csontos

[57] ABSTRACT

Aliphatic esters of carboxymethene- and carboxyethenethiosuccinic acid are readily prepared in a two-step process comprising (a) the addition reaction between mercaptoacetic or mercaptopropionic acid and butenedioic anhydride to form an acid-anhydride intermediate, and (b) the esterification of the intermediate using monohydric aliphatic alcohols to form the trisester products. The compounds are used with phenol anti-oxidants to provide excellent protection against oxidation of polymers, especially polyolefins.

3 Claims, No Drawings

ALIPHATIC ESTERS OF CARBOXYMETHENE- AND CARBOXYETHENETHIOSUCCINIC ACID

This is a division, of application Ser. No. 191,491 filed Oct. 21, 1971, now abandoned.

BACKGROUND OF THE INVENTION

Aliphatic esters of thioalkionic acids are known as antioxidants for polymers. Thiodipropionic acid esters of the formula

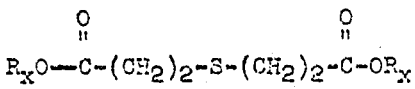

are well known wherein $R_x$ is an aliphatic group such as an alkyl, alkoxy, or thio ether. A Belgium Pat. No. 631,163, discloses compositions of the formula

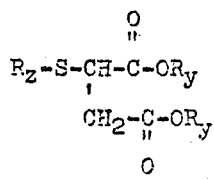

wherein $R_y$ is an alkyl group containing 12 to 18 carbon atoms and $R_z$ is an alkyl group containing 1 to 18 carbon atoms or an aryl group such as phenyl, benzyl, and alkyl substituents thereof. Although the thioalkionic acid esters may be used alone, they are usually used in combination with phenols. Such combinations have been used in polyolefin polymers.

The effectiveness of the phenol/sulfur-containing acid ester combination is limited by the sulfur-containing compound itself. For example, when using the thiodipropionic acid esters with a set level of phenol, the protection to oxidation increases relative to the amount of sulfur-containing acid ester, at least up to levels of 1.0 parts by weight or more. As such, it is desirable to use higher levels. But, these compounds start to bloom from polyolefins at levels as low as 0.25 parts per hundred of polyolefin, and at a level of 1.0 parts per hundred bloom readily. Also, when used at 1.0 parts per hundred, the thiodipropionic acid esters can adversely affect the ultra-violet (UV) light resistance of the polyolefin, lowering the resistance by as much as 15%.

There is a need for a sulfur-containing acid ester that will provide improved oxidative protection for polyolefins, and that will not bloom from or adversely affect the UV resistance of polyolefins.

SUMMARY OF THE INVENTION

The invention provides novel aliphatic esters of carboxymethene- and carboxyethenethiosuccinic acid. Such compounds are particularly useful in providing protection against oxidation of polymers, especially polyolefin polymers. The compounds are used along or alone phenol antioxidants.

DETAILED DESCRIPTION

The novel sulfur-containing acid esters are aliphatic esters of carboxymethene- and carboxyethenethiosuccinic acid. The compounds are named following definitions as found in Lange's Handbook of Chemistry, Revised 10th Edition (1967), Page 336, wherein methene is defined as ($-CH_2-$), ethene as ($-CH_2CH_2-$), and carboxy as ($-COOH$). The formula for these compounds is

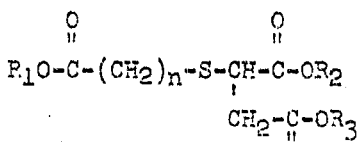

wherein $R_1$, $R_2$ and $R_3$ are selected from the group consisting of an alkyl group containing 8 to 24 carbon atoms, an alkoxy alkyl group containing a total of 6 to 12 carbon atoms, and an alkyl thioalkyl containing a total of 6 to 12 carbon atoms, and n is 1 or 2. The alkyl groups can be linear or branched, i.e., can contain primary, secondary, or tertiary carbon structures. Preferably the R group is an alkyl group of linear structure containing from about 10 to about 18 carbon atoms. Examples of such groups are decyl, dodecyl, pentadecyl, tetradecyl, octadecyl, and the like.

PREPARATION

The carboxymethene- and carboxyethenethiosuccinic acid esters are readily prepared in a two-step process. In the first step, mercaptoacetic or mercaptopropionic acid is reacted with butenedioic acid, its cis-anhydride, the aliphatic esters thereof or the alkali metal salts thereof. The cis form of butenedioic acid is commonly called maleic acid, the trans form is called fumaric acid, the cis anhydride is called maleic anhydride, and the esters are called maleates and fumarates. The intermediate formed in step one is esterified in step two to yield the desired tris ester products.

The following paragraphs disclose the process in more detail. Specific disclosure is made to the reaction of mercaptoacetic acid with maleic acid to form the trisacid intermediate, which is then reacted with a monohydric aliphatic alcohol to form the tris ester product. It is to be understood that the following process can also employ mercaptopropionic acid and/or fumaric acid, and also maleic anhydride and aliphatic maleates and fumarates in place of the maleic or fumaric acid.

The first step of the process comprises the addition reaction of mercaptoacetic acid to maleic acid in the presence of a base catalyst. Although a molar excess of any one of the reactants may be employed, it is preferred to use an essentially equimolar level of each reactant as this makes recovery and purification easier.

The base catalyst can be an inorganic base such as sodium and potassium hydroxide; an alkali alcoholate such as sodium methoxide, potassium butoxide, and the like; an amine such as ammonia, ethylamine, butylamine, diethylamine, pyridine, piperidine, triethylenediamine, and the like; and quaternary ammonium hydroxides such as tetramethyl ammonium hydroxide, dimethyl ethanol benzyl ammonium hydroxide, trimethylbenzyl ammonium hydroxide, and the like. Preferred are the strong organic bases, and most preferred are the quaternary ammonium hydroxides. The base is used in catalytic amounts, ranging from about 0.001 moles to about 0.02 moles per 1 mole of mercaptoacid.

A solvent for the step one reaction may be used. Typical solvents are aromatic hydrocarbons such as benzene, toluene, xylene, and the like, and dioxane and tetrahydrofuran.

The reaction temperature is from about 0°C. to about 100°C. Reaction time is from about 0.5 hours to about 6 hours. The reaction between mercaptoacetic acid and maleic acid produces carboxymethenethiosuccinic acid. Yields in excess of 60% conversion of reactants, to as high as 90%, are obtained.

If maleic anhydride or a dialiphatic maleate were used in place of maleic acid, the products would be carboxymethenethiosuccinic anhydride and carboxymethenethiosuccinic acid (dialiphatic) ester respectively. The use of mercaptopropionic acid in place of mercaptoacetic acid would produce carboxyethenethiosuccinic acid.

The trisacid produced in step one is reacted in step two with a monohydric aliphatic alcohol, in the presence of an acid catalyst, to produce the triester products. Although an excess of one of the reactants may be employed, it is preferred to use essentially three moles of monohydric alcohol to every one mole of trisacid. This molar ratio applies if the step one product is the acid-anhydride product also, but if the step one product is made from a maleate or fumarate, thereby having one or more acid groups already esterified, the ratio should be adjusted accordingly. If the step one product already has ester groups, inter-ester exchange can occur in step two.

The monohydric aliphatic alcohols used are of the formula R-OH wherein R is selected from the group consisting of an alkyl group containing 8 to 24 carbon atoms, an alkoxy alkyl group containing a total of 6 to 12 carbon atoms and an alkyl thioalkyl group containing a total of 6 to 12 carbon atoms. The alkyl group may be linear or branched, i.e., can contain primary, secondary, or tertiary carbon structures. Preferably, the R group is an alkyl group of linear structure containing about 10 to about 18 carbon atoms.

Examples of monohydric aliphatic alcohols are 1-octanol, 1-nonyl alcohol, 7-methyl-1-octanol, 1-decanol, 1-dodecanol, 1-pentadecanol, 1-tetradecanol, 1-octadecanol, and the like; and 4-methoxy-1-hexanol, 5-methoxy-2-methyl-1-pentanol, 7-methoxy-1-heptanol, 3-ethyl-4-ethoxy-1-pentanol, 8-methoxy-1-octanol, 10-ethoxy-1-decanol, and the like; and 4-methylthio-1-hexanol, 8-ethylthio-1-octanol, and the like. Examples of the preferred alcohols would be 1-decanol, 1-dodecanol, 1-pentadecanol, 1-tetradecanol, 1-octadecanol, and the like. Normally only one type of alcohol is used, but mixtures thereof may be employed.

The acid catalyst employed can be any strong organic or inorganic acid. Excellent results are obtained when a strong organic acid is used. Examples of strong organic acids are o-sulfobenzoic acid, dodecylbenzene sulfonic acid, p-toluene sulfonic acid, and the like. The amount of acid used is catalytic, ranging from about 0.001 moles to about 0.02 moles per mole of trisacid.

The acid may be conveniently added to the reaction solution of step one. In this case the acid first neutralizes the base catalyst of step one, and then an excess is added to act as the catalyst for step two. After the acid addition, the alcohol and a solvent are added, and step two of the process can be conducted without having to recover the trisacid intermediate of step one.

UTILITY

The carboxymethene- and carboxyethenethiosuccinic acid esters are useful in providing oxidative protection for organic materials subject to oxygen attack. Such organic materials can be fatty oils and fats, waxes, triglycerides, and the like, but more typically are olefinic polymers having a molecular weight from about 1000 to about one million or more. These olefinic polymers can be saturated polymers or copolymers such as the polyesters, polyvinyl halides, polyvinyl alcohols, polymonoolefins, and the like; or dienic polymers or copolymers such as the polybutadienes, polyisoprenes, styrene-butadiene polymers, butadiene-acrylonitrile polymers, and the like. Alternately, the olefinic polymers can be copolymers of mono- and diolefinic monomers such as the ethylene-propylene-diene polymers wherein the diene can be 1,4-hexadiene, dicyclopentadiene, ethylidene norbornene, and the like.

The compounds have particular utility in providing oxidative protection for polymonoolefin polymers and copolymers. Examples of such are polymers of α-monoolefin monomers such as ethylene, propylene, isobutylene, 1-butene, 1-pentene, 1-hexene, 4-methyl-1-pentene, and the like. Polymers of ethylene, propylene, isobutylene, 1-butene, mixtures thereof, and mixtures with diene monomers are the most common. Such polymers typically have molecular weights ranging from about 3000 to about 20,000 or more.

A solvent need not be used in step two of the process, but preferably an aromatic hydrocarbon like benzene, toluene or xylene is used. The reaction temperature ranges from about 50°C. to about 150°C. A convenient method of conducting the reaction is to run the reaction at the reflux temperature of the solvent. In this manner the water formed in the esterification can be trapped and removed from the system, thereby driving the reaction to further completion. The esterification takes from about 5 hours to about 20 hours.

The triester products, which are low melting solids, are recovered by evaporating the solvent and unreacted ingredients off under reduced pressure. The compounds can be purified by recrystallizing them from an ether-methanol solution and washing the product with dilute hypochlorite bleach to remove trace mercaptan odors. Yield of triester product in excess of 80% conversion of reactants, and up to 98% conversion, are obtained.

The carboxymethene- and carboxyethenethiosuccinic acid esters are used in the amounts from about 0.05 parts to about 7.5 parts by weight based upon 100 parts by weight of the polymer. More typically, they are used in the range from about 0.1 parts to about 3 parts by weight. Excellent results are obtained when they are used at 1.0 parts by weight in combination with a phenol antioxidant.

Any of the known phenol antioxidants can be employed with the compounds of this invention. Typical examples of phenols are the monohydric phenols such as 2,6-di-tert-butyl para cresol, 2,4-diethyl phenol, 2,4,6-trihexyl phenol, the stearyl ester of 4-carboxyethene-2,6-di-tert-butyl-1-hydroxy benzene, and the like; and the polyhydric phenols of the formula

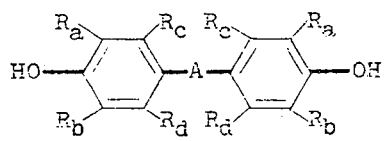

wherein $R_a$, $R_b$, $R_c$ and $R_d$ are —H or an alkyl group containing 1 to 18 carbon atoms in linear or branched structure, and A is —O—, —(S)$_x$— where $x = 1$ to 3, an alkyl group of linear or branched structure containing 1 to 18 carbon atoms, an ether or thioether group containing a total of 2 to 10 carbon atoms, or a ring structure of the group

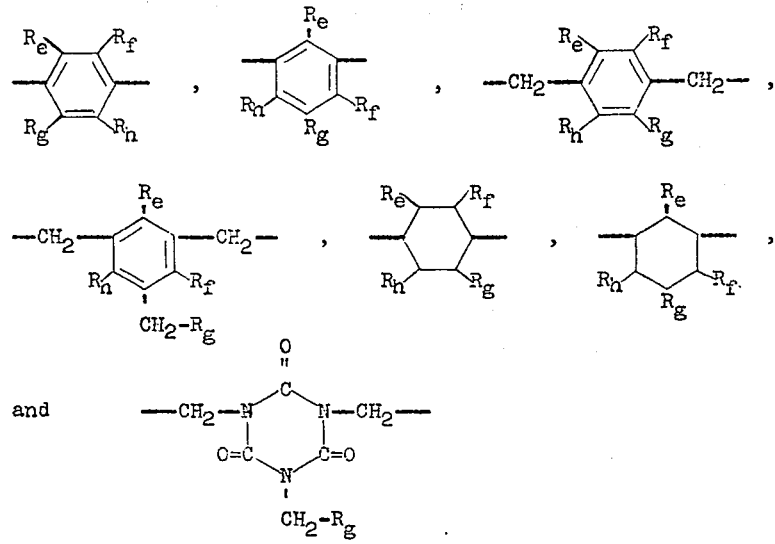

and wherein $R_e$, $R_f$, $R_g$, $R_h$ are —H, an alkyl group of linear or branched structure containing 1 to 18 carbon atoms, an alkoxy group containing 2 to 10 carbon atoms, or a hydroxy group, and $R_g$ can further be a ring structure of the formula

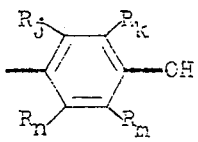

wherein $R_j$, $R_k$, $R_m$ and $R_n$ are —H or an alkyl group of linear or branched structure containing 1 to 18 carbon atoms.

The polyhydric phenols are preferred over the monohydric phenols. Examples of polyhydric phenols are 4,-4'-thiobis(2-tert-butyl-6-methyl phenol), 4,4'-n-butylidenebis(2-tert-butyl-5-methyl phenol), 4,4'-butylidenebis(3-methyl-6-tert-butyl phenol), 4,4'-cyclohexylidenebis(2-tert-butyl phenol), 4,4',4''-trimethylphenyltris(2,6-di-tert-butyl para cresol), 1,3,-5-tris(3,5-di-tert-butyl-4-hydroxybenzyl)isocyanurate and the like. U.S. Pat. No. 3,157,517 discloses more examples of useful phenols.

The phenols are used in the levels from about 0.01 part to about 5.0 parts by weight, and more preferably from about 0.1 part to about 3 parts by weight based upon 100 parts by weight of polymer.

The carboxymethene- and carboxyethenethiosuccinic acid esters and the phenols can be admixed with the olefin polymers using standard mixing equipment such as roll mills, banburys, extruders, and the like. A preferred method of mixing comprises dissolving the antioxidants in a solvent, adding the solution to a polymer slurry, and then evaporating off the solvent(s).

The following examples serve to more fully illustrate the invention.

EXAMPLE I

A series of step one reactions was made in which mercaptoacetic acid was reacted with maleic anhydride to form carboxymethenethiosuccinic anhydride. The recipes, reaction conditions, and percent product yields based on the reactants were as follows:

|  | 1 | 2 | 3 | 4 | 5 | 6 |
|---|---|---|---|---|---|---|
| Maleic anhydride, moles | 0.1 | 0.1 | 0.1 | 0.1 | 0.1 | 0.1 |
| Mercaptoacetic acid, moles | 0.1 | 0.1 | 0.1 | 0.1 | 0.1 | 0.1 |
| Trimethylbenzyl ammonium hydroxide, moles | 0.0006 | 0.0006 | 0.0006 | 0.0006 | | |
| Triethylene diamine, moles | | | | | 0.0008 | 0.0008 |
| Dioxane, milliliters | | | | 200 | | 200 |
| Benzene, milliliters | | | | | | |
| Reaction Temp., °C. | 60 | 70 | 85 | 25 | 80 | 18 |
| Reaction Time, hours | 3 | 3 | 3 | 0.5 | 3 | 2 |
| Percent Product Yield | 90 | 81 | 68 | 57 | 59 | 55 |

The maleic anhydride, the mercaptoacetic acid, 0.1 grams of base catalyst, and 200 milliliters of solvent (if used) were charged to a reactor vessel equipped with a stirrer, a condenser and thermometer. The solutions were heated and stirred for the indicated times. The product, a solid, was recovered by direct drying under reduced pressure. A small portion of the product was hydrolyzed to the trisacid and analyzed by Infra-red and melting point to characterize it.

Reactions were also run using mercaptopropionic acid in place of mercaptoacetic acid. The product was carboxyethenethiosuccinic anhydride.

Reactions were run using the dodecyl ester of maleic acid. The products were carboxymethene- and carboxyethenethiosuccinic acid (dodecyl) ester.

The above products were esterified, using 1-octadecanol in the presence of p-toluene sulfonic acid as the catalyst, to make the desired triester compounds.

EXAMPLE II

A series of runs was made in which the step two esterification reaction was conducted in the same reactor vessel immediately following the step one reaction. Recipes, reaction conditions, and percent product yields were as follows:

|  | 1 | 2 | 3 | 4 |
|---|---|---|---|---|
| Step One | | | | |
| Maleic anhydride, moles | 0.1 | 0.1 | 0.1 | 0.1 |
| Mercaptoacetic anhydride, moles | 0.1 | 0.1 | 0.1 | 0.1 |
| Trimethyl benzyl ammonium hydroxide, moles | 0.0006 | 0.0006 | 0.0002 | 0.0006 |
| Toluene, milliliters |  | 200 | 200 |  |
| Benzene, milliliters |  |  |  | 200 |
| Reaction temperature,°C. | 70 | 110 | 110 | 78 |
| Reaction time, hours | 3 | 5 | 4 | 5 |
| Step Two | | | | |
| p-Toluene sulfonic acid, moles | 0.0012 | 0.0012 | 0.0004 | 0.0012 |
| 1-Octadecanol, moles | 0.3 | 0.3 | 0.3 | 0.3 |
| Toluene, milliliters | 200 |  |  |  |
| Reaction temperature,°C. | 110 | 110 | 110 | 78 |
| Reaction time, hours | 16 | 16 | 16 | 16 |
| Percent Product Yield | 84 | 98 | 88 | 96 |

The maleic anhydride, the mercaptoacetic acid, the trimethylbenzyl ammonium hydroxide, and the solvent (if used) were charged to a reactor vessel equipped with a stirrer, a condenser with a trap, and a thermometer. The solutions were heated to reflux and stirred for the indicated times. After cooling, the p-toluene sulfonic acid, 1-octadecanol, and solvent (if used) was added to the solution. They were then again heated to reflux for the prescribed times. The triester product, a solid, was recovered by direct drying under reduced pressure. The compounds were purified by recrystallizing them from ether-methanol solutions. The product was characterized by Infra-red and melting point analysis.

When mercaptopropionic acid was used, the product was the trisoctadecyl ester of carboxyethenethiosuccinic acid. When other monohydric aliphatic alcohols are used in place of 1-octadecanol, the corresponding triester is obtained.

EXAMPLE III

Triester compounds of this invention were evaluated, in combination with various phenols, as antioxidants for a high density polyethylene polymer sold commercially as Petrothene (U.S. Industries). The antioxidants were added to the polyethylene (PE) by dissolving both them in acetone, adding the solution to a slurry of PE in acetone, and then evaporating off the acetone under reduced pressure. The PE was then milled for 5 minutes on a 300°F. roll, sheeted, and put into molds for 5 min. at 300°F. Test samples were prepared by cutting 1 × 2 inch strips of about 25 mil thickness. The PE samples were evaluated by mounting them in a circulating air oven at 125°C. and observing the formation of carbonyl groups which is evidence of oxidation. This was done by periodically measuring the Infra-red absorption of the test samples in the 1500–2000 $cm^{-1}$ region. A plot of absorption versus time in hours is made. Testing is continued until rapid appearance of carbonyl absorption is observed. The time to failure is measured as the time indicated by the intersection of two straight lines, one drawn to the slope of the initial absorption readings (almost a horizontal line) and one drawn to the slope of the rapid absorption readings. With the onset of rapid carbonyl appearance, the PE becomes embrittled.

Included in the valuation were PE sample (X) containing a thiodialkionic acid ester and PE sample (Y) containing a compound of the Belgium patent composition. Results were as follows:

| Sulfur Compound | pph[7] | Phenol | pph[7] | Hours at 125°C. |
|---|---|---|---|---|
| A[1] | 0.3 | Irganox 1076[5] | 0.1 | 7300 |
|  | 0.3 | Ethyl 736[6] | 0.1 | 5000 |
| B[2] | 0.3 | Irganox 1076 | 0.1 | 7300 |
|  | 0.3 | Ethyl 736 | 0.1 | 5000 |
| X[3] | 0.3 | Irganox 1076 | 0.1 | 2600 |
|  | 0.3 | Ethyl 736 | 0.1 | 1900 |
| Y[4] | 0.3 | Irganox 1076 | 0.1 | 3500 |
|  | 0.3 | Ethyl 736 | 0.1 | 3100 |

1   triester of the formula: $R_1OOC-CH_2-S-\underset{\underset{COOR_3}{|}}{CH}-CH_2-COOR_2$ wherein $R_1$ is an octadecyl group and $R_2$ and $R_3$ are dodecyl groups 2   triester of the formula: $R_1OOC-CH_2CH_2-S-\underset{\underset{COOR_3}{|}}{CH}-CH_2-COOR_2$ wherein $R_1$ is an octadecyl group and $R_2$ and $R_3$ are dodecyl groups 3   distearyl ester of thiodipropionic acid
4   didodecyl ester of dodecylthiosuccinic acid
5   stearyl ester of 4-carboxyethene-2,6-di-tert-butyl-1-hydroxy benzene
6   4,4′-thiobis(2-tert-butyl-6-methyl phenol)
7   parts by weight per 100 parts by weight of polyethylene The results show that the compounds of this invention far out-perform the other sulfur-containing acid esters.

EXAMPLE IV

The trisoctadecyl ester of carboxyethenethiosuccinic acid was combined with a phenol and evaluated as an antioxidant for a polypropylene polymer sold commercially as Profac 6501 (Hercules, Inc.). The antioxidants were dissolved in benzene and added to a slurry of polypropylene (PP) in benzene, and the benzene evaporated off under reduced pressure. The PP powder was then extruded at 200°C., cut into strips, and molded at 220°C. Test samples of 2 × 1 inches of about 25 mil thickness were prepared. The samples were mounted in a circulating air oven at 140°C. and periodically checked for visual signs of crazing. The time to failure was the time to initial crazing.

Also evaluated were PP samples containing the two sulfur-containing antioxidants evaluated in Example III. Results were as follows:

| Sulfur Compound | pph[3] | Phenol[2] pph[3] | Hours at 140°C. |
|---|---|---|---|
| C[1] | 0.25 | 0.1 | 3336[4] |
|  | 0.25 | 0.25 | 4080[4] |
|  | 1.0 | 0.1 | 8112 |
| X | 0.25 | 0.1 | 4012[4] |
|  | 0.25 | 0.25 | 4348[4] |
|  | 1.0 | 0.1 | 6120 |
| Y | 0.25 | 0.1 | 3036 |
|  | 0.25 | 0.25 | 3132 |

[1]trioctadecyl ester of carboxyethenethiosuccinic acid
[2]1,3,5-tris(3,5-di-tert-butyl-4-hydroxybenzyl)isocyanurate
[3]parts by weight per hundred parts by weight of polypropylene
[4]average value of three tests The data shows that the compound of this invention out-performs the other sulfur-containing acid esters. This is particularly significant in view of the fact that the trisesters of this invention do not bloom while the distearyl ester of thiodipropionic acid (compound X) bloomed readily at 1.0 part per hundred.

EXAMPLE V

Polypropylene samples prepared similarly to those in Example IV were tested for their Ultra-violet (UV) light resistance. The samples were mounted in a Xenon Lamp Weather-Ometer at about 40°C. Periodically, they were checked for carbonyl absorption and evaluated following the procedure in Example III. As a control, a polypropylene sample containing only the phenol was evaluated. Results were as follows:

| Sulfur Compound | pph | pph of Phenol[2] | Hours | Percent Change |
|---|---|---|---|---|
| none | — | 0.1 | 530 | — |
| D[1] | 0.25 | 0.1 | 660 | — |
|  | 1.0 | 0.1 | 647 | + 22 |
| C | 0.25 | 0.1 | 645 | — |
|  | 1.0 | 0.1 | 676 | + 27 |
| X | 0.25 | 0.1 | 570 | — |
|  | 1.0 | 0.1 | 455 | − 14 |

[1]trisoctadecyl ester of carboxymethenethiosuccinic acid
[2]1,3,5-tris(3,5-di-t-butyl-4-hydroxybenzyl)isocyanurate The data shows that the thiodialkionic acid esters adversely affected the UV resistance of the polypropylene when used at levels which yielded good oxidative protection in the heat aging tests. In contrast, the trisesters of this invention, when used at the same levels, not only exhibited better heat aging stability but actually improved the UV resistance of the polypropylene.

Although the specification and examples are drawn to the use of the triester products in polyolefins, they can also be readily used to improve the oxidative stability of other polymers and high molecular weight organic compounds. Examples of such are dienic polymers such as ethylene-propylene-diene polymers, styrene-butadiene polymers, butadiene-acrylonitrile polymers, and the like; saturated polymers such as polyesters, polyvinyl chlorides, polyvinyl alcohols, and the like; and fatty oils and fats such as cottonseed oil, linseed oil, corn oil, olive oil, sardine oil, tall oil, and the like, and lard, waxes, glycerides and the like.

I claim:

1. A composition comprising a poly-α-monoolefin polymer, about 1 part by weight of a compound of the formula

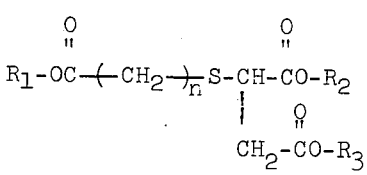

wherein n = 1 or 2, and $R_1$, $R_2$, and $R_3$ are alkyl groups containing 8 to 24 carbon atoms and from 0.01 part to about 5 parts by weight of 1,3,5-tris(3,5-di-t-butyl-4-hydroxybenzyl)isocyanurate, all weights based upon 100 parts by weight of polymer.

2. A composition of claim 1 wherein the poly-α-olefin polymer is selected from polyethylene and polypropylene, and wherein said compound n = 2 and $R_1$, $R_2$, and $R_3$ are alkyl groups containing from about 10 to about 18 carbon atoms in the group.

3. A composition of claim 2 wherein said compound $R_1$, $R_2$, and $R_3$ are octadecyl.

* * * * *